United States Patent
Guo et al.

(10) Patent No.: US 10,686,633 B2
(45) Date of Patent: Jun. 16, 2020

(54) DOWNLINK CONTROL SIGNALING SENDING METHOD AND DEVICE

(71) Applicant: Huawei Technologies Co., Ltd., Shenzhen, Guangdong (CN)

(72) Inventors: Zhiheng Guo, Beijing (CN); Hai Wu, Beijing (CN); Xingqing Cheng, Beijing (CN); Yi Long, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 75 days.

(21) Appl. No.: 15/934,586

(22) Filed: Mar. 23, 2018

(65) Prior Publication Data

US 2018/0212802 A1    Jul. 26, 2018

Related U.S. Application Data

(63) Continuation of application No. PCT/CN2015/090516, filed on Sep. 24, 2015.

(51) Int. Cl.
*H04W 72/04*    (2009.01)
*H04L 25/03*    (2006.01)
(Continued)

(52) U.S. Cl.
CPC ...... *H04L 25/03866* (2013.01); *H04L 1/0025* (2013.01); *H04L 1/0068* (2013.01);
(Continued)

(58) Field of Classification Search
None
See application file for complete search history.

(56) References Cited

U.S. PATENT DOCUMENTS

2006/0166634 A1*   7/2006   Ido .................. H04B 7/0808
                                                         455/277.1
2011/0176502 A1    7/2011   Chung et al.
(Continued)

FOREIGN PATENT DOCUMENTS

CN    102106097 A    6/2011
CN    102595385 A    7/2012
(Continued)

OTHER PUBLICATIONS

Sequans Communications; "On Signaling Alternatives for MUST"; 3GPP TSG RAN WG1 Meeting #82; R1-154023; Beijing, China; Aug. 24-28, 2015; 4 pages.
(Continued)

*Primary Examiner* — Brandon M Renner
(74) *Attorney, Agent, or Firm* — Conley Rose, P.C.

(57) ABSTRACT

The present disclosure provides a downlink control signaling sending method and device. The method includes: determining, by a base station, a first transmission type of a first terminal device and a second transmission type of a second terminal device; and sending demodulation information to the first terminal device according to the first transmission type and the second transmission type by using downlink control signaling, where the demodulation information is used to instruct the first terminal device to demodulate a transmission signal of the first terminal device that is received by the first terminal device. In this way, content of the demodulation information to be sent is specifically determined, so as to effectively resolve a problem that, during pairing at a plurality of layers, when different power ratios are configured on different subbands, a large amount of signaling needs to be consumed for notification to the first terminal device.

16 Claims, 2 Drawing Sheets

A base station determines a first transmission type of a first terminal device and a second transmission type of a second terminal device    — 101

The base station sends carried demodulation information to the first terminal device according to the first transmission type and the second transmission type by using downlink control signaling    — 102

(51) Int. Cl.
*H04W 72/12* (2009.01)
*H04L 1/00* (2006.01)
*H04L 1/18* (2006.01)
*H04L 5/00* (2006.01)

(52) U.S. Cl.
CPC ......... *H04L 1/1887* (2013.01); *H04W 72/042* (2013.01); *H04W 72/12* (2013.01); *H04L 1/0003* (2013.01); *H04L 5/0048* (2013.01)

(56) References Cited

U.S. PATENT DOCUMENTS

| | | | |
|---|---|---|---|
| 2013/0044692 A1* | 2/2013 | Nory | H04L 5/0048 370/329 |
| 2013/0279466 A9 | 10/2013 | Lee et al. | |
| 2013/0336256 A1 | 12/2013 | Chung et al. | |
| 2015/0171947 A1 | 6/2015 | Sun et al. | |
| 2016/0183289 A1* | 6/2016 | Qiang | H04W 72/1273 370/280 |
| 2016/0330011 A1* | 11/2016 | Lee | H04L 5/0066 |
| 2017/0013599 A1* | 1/2017 | Sun | H04W 72/042 |
| 2018/0160372 A1* | 6/2018 | Benjebbour | H04W 24/10 |

FOREIGN PATENT DOCUMENTS

| | | |
|---|---|---|
| CN | 103905100 A | 7/2014 |
| CN | 104717753 A | 6/2015 |
| EP | 3273735 A1 | 1/2018 |
| WO | 2015024227 A1 | 2/2015 |

OTHER PUBLICATIONS

Huawei et al.; "TP for classification of MUST schemes"; 3GPP TSG RAN WG1 Meeting#82; R1-154923; Beijing, China; Aug. 24-28, 2015; 7 pages.

Machine Translation and Abstract of Chinese Publication No. CN102595385, Jul. 18, 2012, 21 pages.

Machine Translation and Abstract of Chinese Publication No. CN103905100, Jul. 2, 2014, 18 pages.

Foreign Communication From a Counterpart Application, Chinese Application No. 201580083095.0, Chinese Office Action dated Aug. 27, 2019, 11 pages.

* cited by examiner

DOWNLINK CONTROL SIGNALING SENDING METHOD AND DEVICE

CROSS-REFERENCE TO RELATED APPLICATION

This application is a continuation of International Application No. PCT/CN2015/090516, filed on Sep. 24, 2015, the disclosure of which is hereby incorporated by reference in its entirety.

TECHNICAL FIELD

The present application relates to the field of wireless communications technologies, and in particular, to a downlink control signaling sending method and device.

BACKGROUND

In a 3rd Generation Partnership Project (3GPP) Long Term Evolution (LTE)/Long Term Evolution-Advanced (LTE-A) system, for a downlink multiple access mode, an orthogonal frequency division multiplexing (OFDM) mode is usually used. That is, different users use different time and frequency resources, to ensure that no mutual interference occurs in signal reception of the users, but a transmission rate is relatively low. At present, for pairing in a single stream or at a single layer, two technologies, namely, non-orthogonal multiple access (NOMA) and semi-orthogonal multiple access (SOMA), are mainly used to dynamically allocate a power to a user, so as to implement interference-free high-speed transmission between users and improve a system throughput. For the NOMA, a single resource is allocated to multiple users, transmission signals of the multiple users are superposed in a time/frequency domain, and different powers are then allocated to different users to ensure accurate reception on a user side. For the SOMA, an existing modulation scheme or a Gray encode property of a constellation diagram is further used based on the NOMA, so that receivers of users use a simple reception algorithm, to implement superposition transmission between the users, thereby improving system performance.

In an application of user pairing at a plurality of layers, UE in a cell in an existing LTE system generally has a plurality of transmission modes (for example, codebook-based spatial multiplexing and non-codebook-based spatial multiplexing). During non-orthogonal or semi-orthogonal transmission between UEs that use a same transmission mode or different transmission modes, the UEs obtain power pairing information or layer pairing information in different manners. The power pairing information may be notified to the UEs by using high layer signaling or physical layer signaling or in another non-explicit manner.

A relatively large quantity of bits are needed to notify the power pairing information; overheads are relatively high. In addition, when different powers are configured on different subbands, more signaling needs to be consumed; consequently, signaling overheads of a system are increased to some extent, and a system gain is reduced.

SUMMARY

The present disclosure provides a downlink control signaling sending method and device, to resolve a prior-art problem that signaling overheads are relatively high when power pairing information or layer pairing information is notified in different transmission modes.

A first aspect of embodiments of the present disclosure provides a downlink control signaling sending method, where the method includes:
  determining, by a base station, a first transmission type of a first terminal device and a second transmission type of a second terminal device; and
  sending, by the base station, demodulation information to the first terminal device according to the first transmission type and the second transmission type by using downlink control signaling, where the demodulation information is used to instruct the first terminal device to demodulate a transmission signal of the first terminal device that is received by the first terminal device.

With reference to the first aspect, in a first implementation of the first aspect of the present disclosure, the demodulation information includes control information for demodulating the transmission signal of the first terminal device and control information for demodulating a transmission signal of the second terminal device.

With reference to the first aspect or the first implementation of the first aspect, in a second implementation of the first aspect of the present disclosure, when the first transmission type is non-codebook-based transmission and the second transmission type is codebook-based transmission, the demodulation information includes a transmission mode of the second terminal device and layer pairing information between the first terminal device and the second terminal device or includes a transmission manner of the second terminal device and layer pairing information between the first terminal device and the second terminal device.

With reference to the first aspect or the first implementation of the first aspect, in a third implementation of the first aspect of the present disclosure, when the first transmission type is codebook-based transmission and the second transmission type is non-codebook-based transmission, the demodulation information includes layer pairing information between the first terminal device and the second terminal device and power pairing information between the first terminal device and the second terminal device; or
  the demodulation information includes an antenna port of the second terminal device, a scrambling identity of the second terminal device, and a layer number of the second terminal device; or
  the demodulation information includes layer pairing information between the first terminal device and the second terminal device and a scrambling identity of the second terminal device.

With reference to the first aspect or the first implementation of the first aspect, in a fourth implementation of the first aspect of the present disclosure, when the first transmission type is non-codebook-based transmission, the second transmission type is non-codebook-based transmission, and a reference signal used by the first terminal device at a pairing spatial layer is the same as a reference signal used by the second terminal device at the pairing spatial layer, the demodulation information includes layer pairing information between the first terminal device and the second terminal device and power pairing information between the first terminal device and the second terminal device.

With reference to the first aspect or the first implementation of the first aspect, in a fifth implementation of the first aspect of the present disclosure, when the first transmission type is non-codebook-based transmission, the second transmission type is non-codebook-based transmission, and a reference signal used by the first terminal device at a pairing spatial layer is different from a reference signal used by the second terminal device at the pairing spatial layer, the demodulation information includes layer pairing information between the first terminal device and the second terminal device and power pairing information between the first terminal device and the second terminal device; or the demodulation information includes an antenna port of the second terminal device, a scrambling identity of the second terminal device, and a layer number of the second terminal device; or the demodulation information includes layer pairing information between the first terminal device and the second terminal device and a scrambling identity of the second terminal device.

With reference to any one of the first to fifth implementations of the first aspect, in a sixth implementation of the first aspect of the present disclosure, the demodulation information further includes a multiplexing mode and transmission information, the multiplexing mode represents association information between a data signal of the first terminal device and the reference signal used by the second terminal device at the pairing layer, and the transmission information includes a signal and data that are received by the first terminal device when the first terminal device and the second terminal device are paired, and a signal and data that are received by the second terminal device when the first terminal device and the second terminal device are paired.

With reference to the first aspect or any one of the first to sixth implementations of the first aspect, in a seventh implementation of the first aspect of the present disclosure, when the first terminal device and the second terminal device use at least two same spatial layers, the demodulation information carries a modulation scheme of the first terminal device at each spatial layer and the power pairing information; or when the first terminal device and the second terminal device use at least two same spatial layers, the power pairing information is obtained after the base station schedules same power allocation information of the first terminal device and the second terminal device at the at least two spatial layers, the demodulation information further carries modulation scheme combination information, and the modulation scheme combination information is obtained after the base station schedules same modulation schemes of the first terminal device and the second terminal device at the at least two spatial layers.

With reference to the seventh implementation of the first aspect, in an eighth implementation of the first aspect of the present disclosure, the method further includes:

when a reference signal used by the second terminal device that performs non-codebook-based transmission and data sent by the first terminal device that performs codebook-based transmission have a conflict in a time domain and a frequency domain, performing, by the base station, puncturing or rate matching on the data sent by the first terminal device; or when a reference signal used by the first terminal device that performs non-codebook-based transmission and data sent by the second terminal device that performs codebook-based transmission have a conflict in a time domain and a frequency domain, performing, by the base station, puncturing or rate matching on the data sent by the second terminal device.

A second aspect of the present disclosure provides a signal demodulation method, where the method includes:

receiving, by a first terminal device, demodulation information sent by abase station, where the demodulation information is information sent by the base station according to a first transmission type of the first terminal device and a second transmission type of a second terminal device by using downlink control signaling; and demodulating, by the first terminal device, a received transmission signal of the first terminal device according to the demodulation information.

With reference to the second aspect, in a first implementation of the second aspect of the present disclosure, the demodulation information includes control information for demodulating the transmission signal of the first terminal device and control information for demodulating a transmission signal of the second terminal device.

With reference to the second aspect or the first implementation of the second aspect, in a second implementation of the second aspect of the present disclosure, when the first transmission type is non-codebook-based transmission and the second transmission type is codebook-based transmission, the demodulation information includes a transmission mode of the second terminal device and layer pairing information between the first terminal device and the second terminal device or includes a transmission manner of the second terminal device and layer pairing information between the first terminal device and the second terminal device.

With reference to the second aspect or the first implementation of the second aspect, in a third implementation of the second aspect of the present disclosure, when the first transmission type is codebook-based transmission and the second transmission type is non-codebook-based transmission, the demodulation information includes layer pairing information between the first terminal device and the second terminal device and power pairing information between the first terminal device and the second terminal device; or the demodulation information includes an antenna port of the second terminal device, a scrambling identity of the second terminal device, and a layer number of the second terminal device; or the demodulation information includes layer pairing information between the first terminal device and the second terminal device and a scrambling identity of the second terminal device.

With reference to the second aspect or the first implementation of the second aspect, in a fourth implementation of the second aspect of the present disclosure, when the first transmission type is non-codebook-based transmission, the second transmission type is non-codebook-based transmission, and a reference signal used by the first terminal device at a pairing spatial layer is the same as a reference signal used by the second terminal device at the pairing spatial layer, the demodulation information includes layer pairing information between the first terminal device and the second terminal device and power pairing information between the first terminal device and the second terminal device.

With reference to the second aspect or the first implementation of the second aspect, in a fifth implementation of the second aspect of the present disclosure, when the first transmission type is non-codebook-based transmission, the second transmission type is non-codebook-based transmission, and a reference signal used by the first terminal device at a pairing spatial layer is different from a reference signal used by the second terminal device at the pairing spatial layer, the demodulation information includes layer pairing information between the first terminal device and the second terminal device and power pairing information between the first terminal device and the second terminal device; or the demodulation information includes an antenna port of the second terminal device, a scrambling identity of the second terminal device, and a layer number of the second terminal device; or the demodulation information includes layer pairing information between the first terminal device and the second terminal device and a scrambling identity of the second terminal device.

With reference to any one of the first to fifth implementations of the second aspect, in a sixth implementation of the second aspect of the present disclosure, the demodulation information further includes a multiplexing mode and transmission information, the multiplexing mode represents association information between a data signal of the first terminal device and the reference signal used by the second terminal device at the pairing spatial layer, and the transmission information includes a signal and data that are received by the first terminal device when the first terminal device and the second terminal device are paired, and a signal and data that are received by the second terminal device when the first terminal device and the second terminal device are paired.

With reference to any one of the second to sixth implementations of the second aspect, in a seventh implementation of the second aspect of the present disclosure, after the receiving, by a first terminal device, demodulation information sent by a base station, and before the demodulating, by the first terminal device, a received transmission signal of the second terminal device according to the demodulation information, the method further includes at least one of the following steps:

performing, by the first terminal device, channel estimation on the reference signal of the second terminal device corresponding to the antenna port or the scrambling identity, to obtain a second power used by the second terminal device to send the transmission signal, and obtaining the power pairing information according to the second power and a first power used by the first terminal device to send a signal; and obtaining the layer pairing information according to the layer number and a layer number of the first terminal device; or performing, by the first terminal device, channel estimation on the reference signal of the second terminal device corresponding to the scrambling identity, to obtain a second power used by the second terminal device to send the transmission signal, and obtaining the power pairing information according to the second power and a first power used by the first terminal device to send a signal; and the demodulating, by the first terminal device, a received transmission signal of the second terminal device according to the demodulation information includes:

demodulating, by the first terminal device, the transmission signal according to the power pairing information and the layer pairing information.

With reference to any one of the first to seventh implementations of the second aspect, in an eighth implementation of the second aspect of the present disclosure, the reference signal used by the second terminal device at the pairing spatial layer is obtained according to at least one of the following:

obtaining the reference signal by detecting a channel by the first terminal device;

obtaining the reference signal according to the antenna port; or obtaining the reference signal according to the scrambling identity.

With reference to any one of the first to eighth implementations of the second aspect, in a ninth implementation of the second aspect of the present disclosure, when the first terminal device and the second terminal device use at least two same spatial layers, the demodulation information carries a modulation scheme of the first terminal device at each spatial layer and the power pairing information; or when the first terminal device and the second terminal device use at least two same spatial layers, the power pairing information is obtained after the base station schedules same power allocation information of the first terminal device and the second terminal device at the at least two spatial layers, the demodulation information further carries modulation scheme combination information, and the modulation scheme combination information is obtained after the base station schedules same modulation schemes of the first terminal device and the second terminal device at the at least two spatial layers.

A third aspect of the present disclosure provides a base station, where the base station includes:

a processing module, configured to determine a first transmission type of a first terminal device and a second transmission type of a second terminal device; and a sending module, configured to send, according to the first transmission type and the second transmission type that are determined by the processing module, demodulation information to the first terminal device by using downlink control signaling, where the demodulation information is used to instruct the first terminal device to demodulate a transmission signal of the first terminal device that is received by the first terminal device.

With reference to the third aspect, in a first implementation of the third aspect of the present disclosure, the demodulation information includes control information for demodulating the transmission signal of the first terminal device and control information for demodulating a transmission signal of the second terminal device.

With reference to the third aspect or the first implementation of the third aspect, in a second implementation of the third aspect of the present disclosure, when the first transmission type is non-codebook-based transmission and the second transmission type is codebook-based transmission, the demodulation information includes a transmission mode of the second terminal device and layer pairing information between the first terminal device and the second terminal device or includes a transmission manner of the second terminal device and layer pairing information between the first terminal device and the second terminal device.

With reference to the third aspect or the first implementation of the third aspect, in a third implementation of the third aspect of the present disclosure, when the first transmission type is codebook-based transmission and the second transmission type is non-codebook-based transmission, the demodulation information includes layer pairing information between the first terminal device and the second terminal device and power pairing information between the first terminal device and the second terminal device; or the demodulation information includes an antenna port of the second terminal device, a scrambling identity of the second terminal device, and a layer number of the second terminal device; or the demodulation information includes layer pairing information between the first terminal device and the second terminal device and a scrambling identity of the second terminal device.

With reference to the third aspect or the first implementation of the third aspect, in a fourth implementation of the third aspect of the present disclosure, when the first transmission type is non-codebook-based transmission, the second transmission type is non-codebook-based transmission, and a reference signal used by the first terminal device at a pairing spatial layer is the same as a reference signal used by the second terminal device at the pairing spatial layer, the demodulation information includes layer pairing information between the first terminal device and the second terminal device and power pairing information between the first terminal device and the second terminal device.

With reference to the third aspect or the first implementation of the third aspect, in a fifth implementation of the third aspect of the present disclosure, when the first transmission type is non-codebook-based transmission, the second transmission type is non-codebook-based transmission, and a reference signal used by the first terminal device at a pairing spatial layer is different from a reference signal used by the second terminal device at the pairing spatial layer, the demodulation information includes layer pairing information between the first terminal device and the second terminal device and power pairing information between the first terminal device and the second terminal device; or
  the demodulation information includes an antenna port of the second terminal device, a scrambling identity of the second terminal device, and a layer number of the second terminal device; or
  the demodulation information includes layer pairing information between the first terminal device and the second terminal device and a scrambling identity of the second terminal device.

With reference to any one of the first to fifth implementations of the third aspect, in a sixth implementation of the third aspect of the present disclosure, the demodulation information further includes a multiplexing mode and transmission information, the multiplexing mode represents association information between a data signal of the first terminal device and the reference signal used by the second terminal device at the pairing layer, and the transmission information includes a signal and data that are received by the first terminal device when the first terminal device and the second terminal device are paired, and a signal and data that are received by the second terminal device when the first terminal device and the second terminal device are paired.

With reference to the third aspect or any one of the first to sixth implementations of the third aspect, in a seventh implementation of the third aspect of the present disclosure, when the first terminal device and the second terminal device use at least two same spatial layers, the demodulation information carries a modulation scheme of the first terminal device at each spatial layer and the power pairing information; or
  when the first terminal device and the second terminal device use at least two same spatial layers, the power pairing information is obtained after the base station schedules same power allocation information of the first terminal device and the second terminal device at the at least two spatial layers, the demodulation information further carries modulation scheme combination information, and the modulation scheme combination information is obtained after the base station schedules same modulation schemes of the first terminal device and the second terminal device at the at least two spatial layers.

With reference to the seventh implementation of the third aspect, in an eighth implementation of the third aspect of the present disclosure, the processing module is further configured to:
  when a reference signal used by the second terminal device that performs non-codebook-based transmission and data sent by the first terminal device that performs codebook-based transmission have a conflict in a time domain and a frequency domain, perform puncturing or rate matching on the data of the first terminal device; or
  when a reference signal used by the first terminal device that performs non-codebook-based transmission and data sent by the second terminal device that performs codebook-based transmission have a conflict in a time domain and a frequency domain, perform puncturing or rate matching on the data sent by the second terminal device.

A fourth aspect of the present disclosure provides a first terminal device, where the first terminal device includes:
  a receiving module, configured to receive demodulation information sent by a base station, where the demodulation information is information sent by the base station according to a first transmission type of the first terminal device and a second transmission type of a second terminal device by using downlink control signaling; and
  a processing module, configured to demodulate a received transmission signal of the first terminal device according to the demodulation information.

With reference to the fourth aspect, in a first implementation of the fourth aspect of the present disclosure, the demodulation information includes control information for demodulating the transmission signal of the first terminal device and control information for demodulating a transmission signal of the second terminal device.

With reference to the fourth aspect or the first implementation of the fourth aspect, in a second implementation of the fourth aspect of the present disclosure, when the first transmission type is non-codebook-based transmission and the second transmission type is codebook-based transmission, the demodulation information includes a transmission mode of the second terminal device and layer pairing information between the first terminal device and the second terminal device or includes a transmission manner of the second terminal device and layer pairing information between the first terminal device and the second terminal device.

With reference to the fourth aspect or the first implementation of the fourth aspect, in a third implementation of the fourth aspect of the present disclosure, when the first transmission type is codebook-based transmission and the second transmission type is non-codebook-based transmission, the demodulation information includes layer pairing information between the first terminal device and the second terminal device and power pairing information between the first terminal device and the second terminal device; or
  the demodulation information includes an antenna port of the second terminal device, a scrambling identity of the second terminal device, and a layer number of the second terminal device; or
  the demodulation information includes layer pairing information between the first terminal device and the second terminal device and a scrambling identity of the second terminal device.

With reference to the fourth aspect or the first implementation of the fourth aspect, in a fourth implementation of the fourth aspect of the present disclosure, when the first transmission type is non-codebook-based transmission, the second transmission type is non-codebook-based transmission, and a reference signal used by the first terminal device at a pairing spatial layer is the same as a reference signal used by the second terminal device at the pairing spatial layer, the demodulation information includes layer pairing information between the first terminal device and the second terminal device and power pairing information between the first terminal device and the second terminal device.

With reference to the fourth aspect or the first implementation of the fourth aspect, in a fifth implementation of the fourth aspect of the present disclosure, when the first transmission type is non-codebook-based transmission, the second transmission type is non-codebook-based transmission, and a reference signal used by the first terminal device at a pairing spatial layer is different from a reference signal used by the second terminal device at the pairing spatial layer, the demodulation information includes layer pairing information between the first terminal device and the second terminal device and power pairing information between the first terminal device and the second terminal device; or the demodulation information includes an antenna port of the second terminal device, a scrambling identity of the second terminal device, and a layer number of the second terminal device; or the demodulation information includes layer pairing information between the first terminal device and the second terminal device and a scrambling identity of the second terminal device.

With reference to any one of the first to fifth implementations of the fourth aspect, in a sixth implementation of the fourth aspect of the present disclosure, the demodulation information further includes a multiplexing mode and transmission information, the multiplexing mode represents association information between a data signal of the first terminal device and the reference signal used by the second terminal device at the pairing spatial layer, and the transmission information includes a signal and data that are received by the first terminal device when the first terminal device and the second terminal device are paired, and a signal and data that are received by the second terminal device when the first terminal device and the second terminal device are paired.

With reference to any one of the second to sixth implementations of the fourth aspect, in a seventh implementation of the fourth aspect of the present disclosure, the processing module is further configured to perform at least one of the following steps:

performing channel estimation on the reference signal of the second terminal device corresponding to the antenna port or the scrambling identity, to obtain a second power used by the second terminal device to send the transmission signal, and obtaining the power pairing information according to the second power and a first power used by the first terminal device to send a signal; and obtaining the layer pairing information according to the layer number and a layer number of the first terminal device; or performing channel estimation on the reference signal of the second terminal device corresponding to the scrambling identity, to obtain a second power used by the second terminal device to send the transmission signal, and obtaining the power pairing information according to the second power and a first power used by the first terminal device to send a signal; and the processing module is specifically configured to:
demodulate the transmission signal according to the power pairing information and the layer pairing information.

With reference to any one of the first to seventh implementations of the fourth aspect, in an eighth implementation of the fourth aspect of the present disclosure, a reference signal used by the second terminal device at the pairing spatial layer is obtained according to at least one of the following:

obtaining the reference signal by detecting a channel by the first terminal device;

obtaining the reference signal according to the antenna port; or obtaining the reference signal according to the scrambling identity.

With reference to any one of the first to eighth implementations of the fourth aspect, in a ninth implementation of the fourth aspect of the present disclosure, when the first terminal device and the second terminal device use at least two same spatial layers, the demodulation information carries a modulation scheme of the first terminal device at each spatial layer and the power pairing information; or when the first terminal device and the second terminal device use at least two same spatial layers, the power pairing information is obtained after the base station schedules same power allocation information of the first terminal device and the second terminal device at the at least two spatial layers, the demodulation information further carries modulation scheme combination information, and the modulation scheme combination information is obtained after the base station schedules same modulation schemes of the first terminal device and the second terminal device at the at least two spatial layers.

In the present disclosure, during pairing at a plurality of layers, the base station targetedly determines, according to transmission modes of the first terminal device and the second terminal device, content of the demodulation information to be sent. In this way, unnecessary signaling overheads are reduced to some extent, and the first terminal device can dynamically and accurately obtain and demodulate the transmission signal of the first terminal device, to implement correct demodulation or interference cancellation.

DESCRIPTION OF EMBODIMENTS

Figure 1:
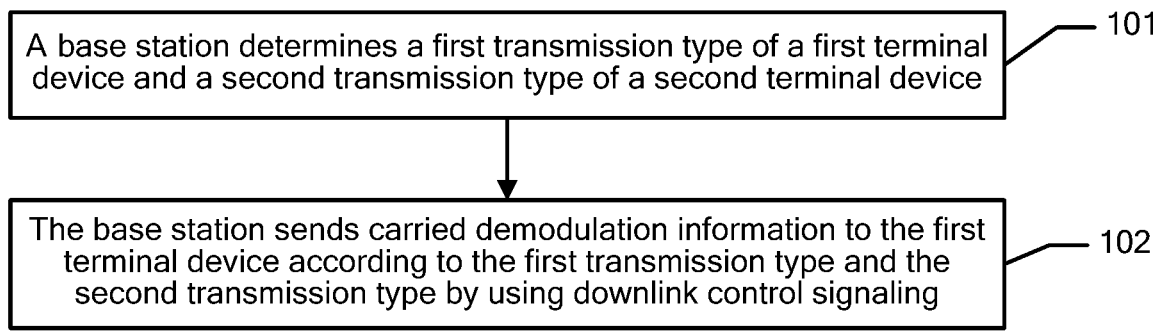
FIG. 1 is a flowchart of a downlink control signaling sending method according to an embodiment of the present disclosure.

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

In the specification, claims, and accompanying drawings of the present disclosure, the terms "first", "second", and so on are intended to distinguish between similar objects but do not necessarily indicate a specific order or sequence. It should be understood that the data termed in such a way are interchangeable in proper circumstances so that the embodiments described herein can be implemented in an order other than the order illustrated or described herein. In addition, the terms "include", "comprise", or any other variant thereof are intended to cover a non-exclusive inclusion. For example, a process, a method, a system, a product, or a device that includes a series of steps or modules is not necessarily limited to the steps or modules that are expressly listed, but may include another step or module not expressly listed or inherent to the process, the method, the product, or the device. The module division in this specification is merely logical division, and may be other division during implementation in actual application. For example, a plurality of modules may be combined or integrated into another system, or some features may be ignored or not performed. In addition, the displayed or discussed mutual couplings or direct couplings or communication connections may be implemented by using some interfaces. The indirect couplings or communication connections between the modules may be implemented in electronic or other forms, and this is not limited in this specification. In addition, modules or sub-modules described as separate components may be or may not be physically separated, or may be or may not be physical modules, or may not be grouped into a plurality of circuit modules. Objectives of the solutions of the embodiments of the present disclosure may be achieved by selecting some or all of the modules according to actual requirements.

The embodiments of the present disclosure provide a downlink control signaling sending method and device that are used in an LTE communications system and are specifically used for sending and receiving signals on a physical downlink shared channel (PDSCH). Details are described below.

A terminal device in a cell of an existing LTE system has a plurality of transmission modes, for example, codebook-based spatial multiplexing and non-codebook-based spatial multiplexing. When terminal devices that use a same transmission mode or different transmission modes perform non-orthogonal transmission or semi-orthogonal transmission, the terminal devices obtain layer pairing information and power pairing information in different manners. A terminal device considers a received transmission signal of another terminal device as an interference signal. Therefore, interference cancellation may need to be performed to correctly demodulate of the transmission signal.

For example, when demodulating a transmission signal of a first terminal device A at the center of a cell, the first terminal device A considers a transmission signal of a second terminal device B at an edge of the cell as interference. Therefore, the first terminal device A needs to implement demodulation according to downlink control signaling sent by a base station. The downlink control signaling mainly includes power pairing information, layer pairing information, a modulation scheme of the second terminal device B or a modulation scheme of a composite constellation diagram (that is, a result of superposing signals of the first terminal device A and the second terminal device B), and the like.

The power pairing information is used to indicate a power allocation ratio of A to B, so that A can calculate a size of the composite constellation diagram and magnitude of a signal received by A, so as to perform interference cancellation and demodulation.

The layer pairing information is used to indicate a layer pairing relationship between terminal devices. For example, the first terminal device A uses two spatial layers during transmission, the second terminal device B uses one spatial layer, and the spatial layer of B and a first spatial layer of the first terminal device A are superposed non-orthogonally or semi-orthogonally; in this case, the first terminal device A needs to know whether the spatial layer of the second terminal device B and the first spatial layer of the first terminal device A are superposed non-orthogonally or semi-orthogonally. Therefore, the first terminal device A may obtain the following states according to a mapping relationship shown in Table 1:

TABLE 1

| Layer pairing state number | Quantity of layers of B in pairing | Quantity of layers of A in pairing | Sequence number of a pairing layer |
| --- | --- | --- | --- |
| 0 | 1 | 2 | 1 |
| 1 | 1 | 2 | 2 |
| 2 | 2 | 2 | 1, 2 |
| 3 | | Reserved | |

In addition, in a manner of obtaining the layer pairing information, an antenna port number used by a user of the second terminal device B may be notified to the first terminal device A, so that the first terminal device A can obtain a layer mapping relationship between the first terminal device A and the second terminal device B.

It may be understood that when both the first terminal device A and the second terminal device B use only one spatial layer, no layer pairing relationship exists. When demodulating a signal, the first terminal device A does not need to obtain layer pairing information. The layer pairing information in this specification includes pairing information, at each pairing spatial layer, of the first terminal device A and the second terminal device B that are in a paired state. In addition, the power pairing information includes power allocation information, at each pairing spatial layer, of the first terminal device A and the second terminal device B that are in a paired state.

When demodulating the transmission signal received by the first terminal device A, the first terminal device A needs to use the layer pairing information, the power pairing information, and the modulation scheme of the second terminal device B or the modulation scheme of the composite constellation diagram to calculate a shape and size of the composite constellation diagram, so as to correctly demodulate the transmission signal according to the composite constellation diagram. The modulation scheme of the second terminal device B or the modulation scheme of the composite constellation diagram may be obtained from downlink control signaling delivered by the base station, or may be obtained by the first terminal device A by performing blind detection. This is specifically not limited.

Existing notification of demodulation information by using downlink control signaling requires relatively high signaling overheads. To reduce signaling overheads, in a major solution in this embodiment of the present disclosure, the base station determines, according to a transmission type of the first terminal device A and a transmission type of the second terminal device B, modulation information carried in downlink control signaling, to notify the first terminal device A of the modulation information, so that the first terminal device A can accurately demodulate a signal. The transmission type includes codebook-based transmission or non-codebook-based transmission.

The codebook-based transmission may be explained as follows: A receive end knows precoding matrix information (a limited quantity of option sets of a transmission matrix) used when a transmit end sends data. That is, at the same time when sending data, the transmit end may notify, in downlink signaling, the receive end of the precoding matrix information used to send the data. Alternatively, the receive end and the transmit end pre-negotiate the precoding matrix information or implicitly notify the precoding matrix information.

The non-codebook transmission may be explained as follows: The precoding matrix information used when the transmit end sends the data is transparent to the receive end. The receive end does not necessarily know the precoding matrix information used when the transmit end sends data. The precoding matrix set used when the transmit end sends the data may be an infinite set.

The present disclosure is mainly used for resolving a problem about how the first terminal device A obtains demodulation information in the following several combinations of transmission modes. Details are shown in Table 2:

TABLE 2

| Combination number | Transmission mode of the first terminal device A | Transmission mode of the second terminal device B |
| --- | --- | --- |
| 1 | Codebook based (TM4/5/6) | Codebook based (TM4/5/6) |
| 2 | Non-codebook based (TM9/10) | Codebook based (TM4/5/6) |
| 3 | Codebook based (TM4) | Non-codebook based (TM8/9/10) |
| 4 | Non-codebook based TM8/9/10 (DMRS A) | Non-codebook based TM8/9/10 (DMRS A) |
| 5 | Non-codebook based (TM8/9/10, DMRS A) | Non-codebook based (TM8/9/10, DMRS B) |

TM represents a transmission mode (TM), and DMRS represents a demodulation reference signal (DMRS).

Referring to FIG. 1, the following describes a downlink control signaling sending method in an embodiment of the present disclosure from a perspective of a base station. The method includes the following steps.

101: The base station determines a first transmission type of a first terminal device and a second transmission type of a second terminal device.

102: The base station sends carried demodulation information to the first terminal device according to the first transmission type and the second transmission type by using downlink control signaling.

The demodulation information is used to instruct the first terminal device to demodulate a transmission signal of the first terminal device that is received by the first terminal device, or used to instruct the first terminal device to demodulate the transmission signal of the first terminal device that is received by the first terminal device, and demodulate a transmission signal of the second terminal device that is received by the first terminal device.

For example, when demodulating the transmission signal of the first terminal device that is received by the first terminal device, the first terminal needs to obtain modulation information of the second terminal device. For example, a composite constellation diagram of the first terminal device and the second terminal device is 64 quadrature amplitude modulation (QAM). The first terminal device uses 16QAM, and the second terminal device uses quadrature phase shift keying (QPSK). The first terminal device can learn that the composite constellation diagram is 64QAM only when the first terminal device obtains modulation type information of the second terminal device, so that the first terminal device may demodulate a signal of the first terminal device according to the composite constellation diagram, but does not need to demodulate the transmission signal of the second terminal device. However, a CW-IC receiver for non-orthogonal multiple access (NOMA) needs to demodulate the transmission signal of the second terminal device.

In this embodiment of the present disclosure, during pairing at a plurality of layers, the base station targetedly determines, according to transmission modes of the first terminal device and the second terminal device, content of the demodulation information to be sent, so as to effectively resolve a problem that, during pairing at a plurality of layers, when different power ratios are configured on different subbands, a large amount of signaling needs to be consumed for notification to the first terminal device. In this way, unnecessary signaling overheads are reduced to some extent, and the first terminal device can dynamically and accurately obtain and demodulate the transmission signal of the first terminal device, to implement correct descrambling.

The demodulation information may be: a, control information for demodulating the first terminal device, and/or, b, some or all control information for demodulating the second terminal device.

In this case, the base station may determine, according to an actual case, a manner of sending demodulation information. That is, the sending carried demodulation information to the first terminal device by using downlink control signaling specifically includes the following steps:

1. Only one piece of downlink control signaling is sent or downlink control signaling is sent only once:

In this case, the modulation information includes a and b, that is, a and b are sent by using first downlink control signaling.

When the downlink control signaling is sent, if a and b occupy a relatively large quantity of bits, or only one user requires a and b, the downlink control signaling may further be sent by using at least two control channels. For example, a and b have a total of 100 bits, and 50 bits may be separately sent by using the two control channels, and resources can be saved to some extent.

2. Downlink control signaling is sent at least twice:

a and b are separately sent.

Specifically, a is sent by using the first downlink control signaling, b is sent by using second downlink control signaling, or a and b are sent by sending signaling for a plurality of times. The control signaling herein may alternatively be sent separately by using at least two control channels.

For example, because there are many transmission modes, transmission types of the first terminal device and the second terminal device may be the same or different. The transmission type includes codebook-based transmission or non-codebook-based transmission. For example, when a transmission mode is TM2/3/4/5/6, a transmit diversity transmission mode and/or a spatial multiplexing transmission type corresponding to the transmission mode may be categorized as codebook-based transmission. When a transmission mode is TM7/8/9/10, a spatial multiplexing transmission type corresponding to the transmission mode is non-codebook-based transmission, and a transmit diversity transmission mode corresponding to the transmission mode may be categorized as non-codebook-based transmission. Optionally, downlink control signaling carrying the demodulation information may be sent for a plurality of times by using carrier aggregation, thereby improving reliability.

When the base station selects different transmission modes for a terminal device, transmission types corresponding to the transmission modes may be different or the same, and may be roughly classified into the following cases.

1. When the first transmission type is non-codebook-based transmission and the second transmission type is codebook-based transmission, the demodulation information includes the transmission mode of the second terminal device and layer pairing information between the first terminal device and the second terminal device or includes a transmission manner of the second terminal device and layer pairing information between the first terminal device and the second terminal device. The transmission mode is a transmission mode defined in 3GPP, for example, TM1/2/3/4/5/6/7/8/9/10. The transmission manner is a transmission manner defined in 3GPP, for example, transmit diversity, large delay cyclic delay diversity, closed-loop spatial multiplexing, and multi-user multiple input multiple output (MIMO).

This case considers a scenario about how corresponding downlink control signaling is sent when the first terminal device that performs non-codebook-based transmission and the second terminal device that performs codebook-based transmission perform non-orthogonal superposition transmission or semi-orthogonal superposition transmission, so that the first terminal device can demodulate the transmission signal of the first terminal device.

2. When the first transmission type is codebook-based transmission and the second transmission type is non-codebook-based transmission, the demodulation information includes layer pairing information between the first terminal device and the second terminal device and power pairing information between the first terminal device and the second terminal device.

Alternatively, the demodulation information includes an antenna port (Antenna Ports) of the second terminal device, a scrambling identity (SCID) of the second terminal device, and a layer number (number of layers) of the second terminal device; in this case, the first terminal device can obtain power pairing information according to the SCID and obtain layer pairing information according to a layer number. For example, when the transmission mode of the second terminal device is TM9, the demodulation information needs to include only the three pieces of information; or another transmission mode may be used. This is specifically not limited herein.

Alternatively, the demodulation information includes layer pairing information between the first terminal device and the second terminal device and a scrambling identity of the second terminal device. For example, when the transmission mode of the second terminal device is TM8, the demodulation information needs to include only the two pieces of information; or another transmission mode may be used. This is specifically not limited herein.

The scrambling identity is a parameter used when a reference signal is generated. The scrambling identity is defined according to a downlink control information (DCI) format (2B, 2C, or 2D) related to physical downlink shared channel transmission in 3GPP protocols.

In this case, because the terminal device has different transmission modes, the downlink control signaling sent by the base station to the terminal device has corresponding different content. For example, if the second terminal device uses TM8, the downlink control signaling can include only an SCID and layer pairing information. That is, the layer pairing information needs to be additionally sent. If the second terminal device uses TM9, the downlink control signaling can include only "antenna ports, an SCID and a number of layers". That is, the layer pairing information does not need to be additionally sent. Cases of other transmission modes are not described again.

3. When the first transmission type is non-codebook-based transmission, the second transmission type is non-codebook-based transmission, and a reference signal used by the first terminal device at a pairing spatial layer is the same as a reference signal used by the second terminal device at the pairing spatial layer, the demodulation information includes layer pairing information between the first terminal device and the second terminal device and power pairing information between the first terminal device and the second terminal device. Optionally, same reference signals may be configured by using downlink signaling or same reference signals may be agreed upon by using downlink signaling.

In this case, when the reference signals used by the first terminal device and the second terminal device are the same, the first terminal device does not need to obtain, according to the SCID of the second terminal device, the reference signal used by the second terminal device. That is, the base station may not need to send the SCID to the first terminal device.

4. When the first transmission type is non-codebook-based transmission, the second transmission type is non-codebook-based transmission, and a reference signal used by the first terminal device at a pairing spatial layer is different from a reference signal used by the second terminal device at the pairing spatial layer, the demodulation information includes layer pairing information between the first terminal device and the second terminal device and power pairing information between the first terminal device and the second terminal device.

Alternatively, the demodulation information includes an antenna port of the second terminal device, a scrambling identity of the second terminal device, and a layer number of the second terminal device. For example, when the transmission mode of the second terminal device is TM9, the demodulation information needs to include only the three pieces of information; or another transmission mode may be used. This is specifically not limited herein.

Alternatively, the demodulation information includes layer pairing information between the first terminal device and the second terminal device and a scrambling identity of the second terminal device. For example, when the transmission mode of the second terminal device is TM8, the demodulation information needs to include only the two pieces of information; or another transmission mode may be used. This is specifically not limited herein. Optionally, the reference signal may be configured to be different by using downlink signaling or negotiated to be different (which may be reflected by setting different values of the SCID).

In the four cases, when the transmission type of the terminal device is non-codebook-based transmission, the reference signal used by the terminal device may be a DMRS or a user equipment specific reference signal (UE Specific RS). When the transmission type of the terminal device is codebook-based transmission, the reference signal used by the terminal device may be a cell-common reference signal (Cell Specific Reference Signal, CSRS).

For example, the first terminal device may perform channel estimation on the reference signal of the second terminal device corresponding to the antenna port or the scrambling identity, to eventually obtain the power pairing information. In addition, the first terminal device may obtain the layer pairing information according to the layer number.

Specifically, a manner in which the first terminal device obtains the power pairing information and the layer pairing information is as follows:

The first terminal device performs channel estimation on a reference signal used at the pairing spatial layer by the second terminal device corresponding to the antenna port or the scrambling identity, to obtain a second power used by the second terminal device to send the transmission signal, and obtains the power pairing information according to the second power and a first power used by the first terminal device to send a signal; and obtains the layer pairing information according to the layer number and a layer number of the first terminal device.

Alternatively, the first terminal device performs channel estimation on the reference signal of the second terminal device corresponding to the scrambling identity, to obtain a second power used by the second terminal device to send the transmission signal, and obtains the power pairing information according to the second power and a first power used by the first terminal device to send a signal.

The first terminal device may obtain, according to at least one of the following, a reference signal used by the second terminal device at the pairing spatial layer:

obtaining the reference signal by detecting a channel by the first terminal device;

obtaining the reference signal according to the antenna port; or obtaining the reference signal according to the scrambling identity.

Optionally, modulation information in the four cases may further include modulation scheme combination information or a modulation scheme of the first terminal device (the first terminal device may be obtained by performing blind detection). For the modulation scheme combination information or the modulation scheme, refer to Table 3.

TABLE 3

| Modulation scheme of the first terminal device | QPSK | QPSK | QAPSK | 16QAM | 16QAM |
|---|---|---|---|---|---|
| Modulation scheme of the second terminal device | QPSK | 16QAM | 64QAM | QPSK | 16QAM |

| Power allocation index | Power of the first terminal device:power of the first terminal device | | | | |
|---|---|---|---|---|---|
| 0 | A01:B01 | A02:B02 | A03:B03 | A04:B04 | A05:B05 |
| 1 | A11:B11 | A12:B12 | A13:B13 | A14:B14 | A15:B15 |
| 2 | A21:B21 | A22:B22 | A23:B23 | A24:B24 | A25:B25 |
| 3 | A41:B41 | A42:B42 | A33:B33 | A34:B34 | A35:B35 |

As may be learned from Table 3, the modulation scheme combination information or the modulation scheme may specifically include one of the following two cases:

When the first terminal device and the second terminal device use at least two same spatial layers, the demodulation information carries the modulation scheme of the first terminal device at each spatial layer and the power pairing information. That is, the base station needs to separately send the modulation scheme of the first terminal device at each pairing spatial layer and the power pairing information to the first terminal device.

When the first terminal device and the second terminal device use at least two same spatial layers, the power pairing information is obtained after the base station schedules same power allocation information of the first terminal device and the second terminal device at the at least two spatial layers. That is, the base station sends downlink control signaling carrying scheduled modulation scheme combination information and the power pairing information to the first terminal device. Therefore, only one group of modulation scheme combination information and power pairing information needs to be notified, thereby reducing signaling overheads.

An option set of power pairing information corresponding to different modulation scheme combination information is variable.

Optionally, the demodulation information may further include a multiplexing mode and transmission information, the multiplexing mode represents association information between a data signal of the first terminal device and the reference signal used by the second terminal device at the pairing layer, and the transmission information includes a signal and data that are sent by the first terminal device and a signal and data that are sent by the second terminal device when the first terminal device and the second terminal device are paired.

Optionally, in some embodiments of the present disclosure, the method further includes:

when a reference signal used by the second terminal device that performs non-codebook-based transmission and data sent by the first terminal device that performs codebook-based transmission have a conflict in a time domain and a frequency domain, performing, by the base station, puncturing or rate matching on the data sent by the first terminal device; or when a reference signal used by the first terminal device that performs non-codebook-based transmission and data sent by the second terminal device that performs codebook-based transmission have a conflict in a time domain and a frequency domain, performing, by the base station, puncturing or rate matching on the data sent by the second terminal device.

For example, in a cell in an LTE system, when two users use different transmission modes TMs, for example, a transmission mode of a center user located at a center of the cell is TM2, and a transmission mode of an edge user located at an edge of the cell is TM9, and when signals of the two users are superposed according to a signal transmission type in a current LTE protocol, some data in TM2 and a DMRS (reference signal) in TM9 are superposed. Consequently, a conflict between data and a reference signal occurs.

According to a puncturing or rate matching manner in this optional embodiment, the conflict can be resolved. When data and reference signals of two users have a conflict, 1. if the data and the reference signals are directly superposed, a signal is sent according to a signal transmission type in existing LTE; or 2. a user in TM2 does not send a signal in a position of a reference signal of a user in TM9.

A signal is not sent in two cases:
a. The user in TM2 performs signal mapping according to the signal transmission type in the current LTE protocol, but does not send a data signal in the position of the reference signal of the user in TM9.
b. Because the reference signal of the user in TM9 is already occupied, the user in TM2 cannot transmit data during encoding and rate matching. Instead, the user in TM2 first selects time and frequency resources in a position other than the position of the reference signal of the user in TM9, and then performs rate matching.

Figure 2:
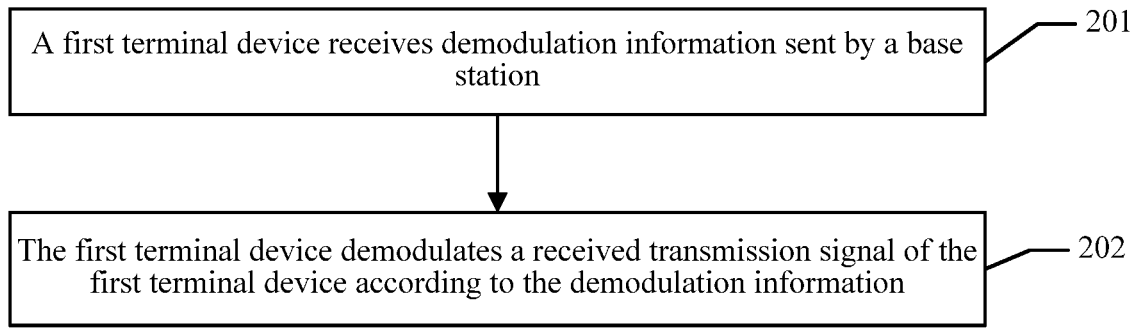
FIG. 2 is a flowchart of a signal demodulation method according to an embodiment of the present disclosure.

Referring to FIG. 2, the following describes a downlink control signaling sending method in an embodiment of the present disclosure from a perspective of a first terminal device. The method includes the following steps.

201: The first terminal device receives demodulation information sent by a base station.

The demodulation information is information sent by the base station according to a first transmission type of the first terminal device and a second transmission type of a second terminal device by using downlink control signaling. The demodulation information includes control information for demodulating a transmission signal of the first terminal device and control information for demodulating a transmission signal of the second terminal device.

202: The first terminal device demodulates a received transmission signal of the first terminal device according to the demodulation information.

In this embodiment of the present disclosure, during pairing at a plurality of layers, the first terminal device receives the demodulation information sent by the base station according to transmission modes of the first terminal device and the second terminal device, and demodulates the received transmission signal of the first terminal device according to content of the demodulation information. In this way, unnecessary signaling overheads are reduced to some extent, and the first terminal device can dynamically and accurately obtain and demodulate the transmission signal of the first terminal device, to implement correct descrambling.

For example, there are many transmission modes. Therefore, transmission types of the first terminal device and the second terminal device may be the same or different. The transmission type includes codebook-based transmission or non-codebook-based transmission. When a terminal device selects different transmission modes, transmission types corresponding to the transmission modes may be different or the same, and may be roughly classified into the following cases.

1. When the first transmission type is non-codebook-based transmission and the second transmission type is codebook-based transmission, the demodulation information includes the transmission mode of the second terminal device and layer pairing information between the first terminal device and the second terminal device or includes a transmission manner of the second terminal device and layer pairing information between the first terminal device and the second terminal device.

2. When the first transmission type is codebook-based transmission and the second transmission type is non-codebook-based transmission, the demodulation information includes layer pairing information between the first terminal device and the second terminal device and power pairing information between the first terminal device and the second terminal device.

Alternatively, the demodulation information includes an antenna port of the second terminal device, a scrambling identity of the second terminal device, and a layer number of the second terminal device. For example, when the transmission mode of the second terminal device is TM9, the demodulation information needs to include only the three pieces of information; or another transmission mode may be used. This is specifically not limited herein.

Alternatively, the demodulation information includes layer pairing information between the first terminal device and the second terminal device and a scrambling identity of the second terminal device. For example, when the transmission mode of the second terminal device is TM8, the demodulation information needs to include only the two pieces of information, or another transmission mode may be used. This is specifically not limited herein.

For example, the first terminal device may perform channel estimation on the reference signal of the second terminal device corresponding to the antenna port or the scrambling identity, to eventually obtain the power pairing information. In addition, the first terminal device may obtain the layer pairing information according to the layer number.

3. When the first transmission type is non-codebook-based transmission, the second transmission type is non-codebook-based transmission, and a reference signal used by the first terminal device at a pairing spatial layer is the same as a reference signal used by the second terminal device at the pairing spatial layer, the demodulation information includes layer pairing information between the first terminal device and the second terminal device and power pairing information between the first terminal device and the second terminal device.

4. When the first transmission type is non-codebook-based transmission, the second transmission type is non-codebook-based transmission, and a reference signal used by the first terminal device at a pairing spatial layer is different from a reference signal used by the second terminal device at the pairing spatial layer, the demodulation information includes layer pairing information between the first terminal device and the second terminal device and power pairing information between the first terminal device and the second terminal device.

Alternatively, the demodulation information includes an antenna port of the second terminal device, a scrambling identity of the second terminal device, and a layer number of the second terminal device. For example, when the transmission mode of the second terminal device is TM9, the demodulation information needs to include only the three pieces of information; or another transmission mode may be used. This is specifically not limited herein.

Alternatively, the demodulation information includes layer pairing information between the first terminal device and the second terminal device and a scrambling identity of the second terminal device. For example, when the transmission mode of the second terminal device is TM8, the demodulation information needs to include only the two pieces of information, or another transmission mode may be used. This is specifically not limited herein.

In the four cases, when the transmission type of the terminal device is non-codebook-based transmission, the reference signal used by the terminal device may be a DMRS or a user equipment specific reference signal (UE Specific RS). When the transmission type of the terminal device is codebook-based transmission, the reference signal used by the terminal device may be a cell-common reference signal (Cell Specific Reference Signal, CSRS).

Optionally, the modulation information in the four cases may further include modulation scheme combination information or a modulation scheme of the first terminal device (which may be obtained by the first terminal device by performing blind detection).

Specifically, one of the two cases is mainly included:

When the first terminal device and the second terminal device use at least two same spatial layers, the demodulation information carries the modulation scheme of the first terminal device at each spatial layer and the power pairing information.

When the first terminal device and the second terminal device use at least two same spatial layers, the power pairing information is obtained after the base station schedules same power allocation information of the first terminal device and the second terminal device at the at least two spatial layers, the demodulation information further carries modulation scheme combination information, and the modulation scheme combination information is obtained after the base station schedules same the modulation schemes at the at least two spatial layers.

Optionally, in some embodiments of the present disclosure, based on case 4, after the receiving, by the first terminal device, demodulation information sent by a base station, and before the demodulating, by the first terminal device, a received transmission signal of the second terminal device according to the demodulation information, the method further includes:
- performing, by the first terminal device, channel estimation by using the reference signal of the first terminal device and the reference signal of the second terminal device, to obtain the power allocation information.

Optionally, in some embodiments of the present disclosure, based on case 3 or 4 (that is, the first transmission type and the second transmission type are both non-codebook transmission), the method further includes:
- receiving, by the first terminal device, the downlink control signaling that is sent by the base station when the first terminal device and the second terminal device use at least two same spatial layers and that carries the modulation scheme of the first terminal device; or
- receiving, by the first terminal device, the downlink control signaling that is sent by the base station when the first terminal device and the second terminal device use at least two same spatial layers and that carries the modulation scheme combination information, where the modulation scheme combination information is obtained by combining modulation schemes of the first terminal device and the second terminal device at the two same spatial layers.

Optionally, the reference signal used by the second terminal device at the pairing spatial layer is obtained according to at least one of the following:
- obtaining the reference signal by detecting a channel by the first terminal device;
- obtaining the reference signal according to the antenna port; or
- obtaining the reference signal according to the scrambling identity.

Optionally, the demodulation information may further include a multiplexing mode and transmission information, the multiplexing type represents association information between a data signal of the first terminal device and the reference signal used by the second terminal device at the pairing spatial layer, and the transmission information includes a signal and data that are sent by the first terminal device and a signal and data that are sent by the second terminal device when the first terminal device and the second terminal device are paired.

Optionally, in some embodiments of the present disclosure, after the receiving, by the first terminal device, demodulation information sent by a base station, and before the demodulating, by the first terminal device, a received transmission signal of the second terminal device according to the demodulation information, the method further includes at least one of the following steps:
- performing, by the first terminal device, channel estimation on the reference signal of the second terminal device corresponding to the antenna port or the scrambling identity, to obtain a second power used by the second terminal device to send the transmission signal, and obtaining the power pairing information according to the second power and a first power used by the first terminal device to send a signal; and obtaining the layer pairing information according to the layer number and a layer number of the first terminal device; or
- performing, by the first terminal device, channel estimation on the reference signal of the second terminal device corresponding to the scrambling identity, to obtain a second power used by the second terminal device to send the transmission signal, and obtaining the power pairing information according to the second power and a first power used by the first terminal device to send a signal; and
- the demodulating, by the first terminal device, a received transmission signal of the second terminal device according to the demodulation information includes:
- demodulating, by the first terminal device, the transmission signal according to the power pairing information and the layer pairing information.

Figure 3:
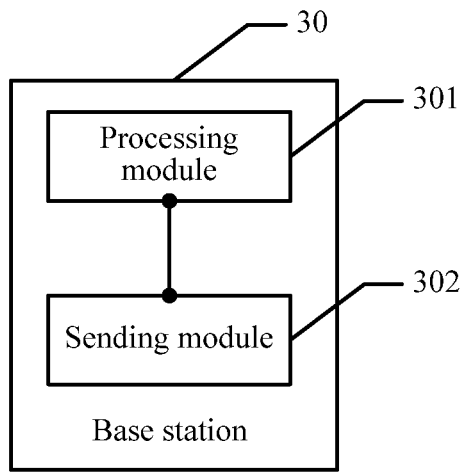
FIG. 3 is a structural diagram of a base station according to an embodiment of the present disclosure.

The foregoing describes the downlink control signaling sending method and a signal demodulation method in the present disclosure by using examples. The following describes a base station that executes the foregoing downlink control signaling sending method. Referring to FIG. 3, a base station 30 in an embodiment of the present disclosure includes:
- a processing module 301, configured to determine a first transmission type of a first terminal device and a second transmission type of a second terminal device; and
- a sending module 302, configured to send, according to the first transmission type and the second transmission type that are determined by the processing module, demodulation information to the first terminal device by using downlink control signaling, where the demodulation information is used to instruct the first terminal device to demodulate a transmission signal of the first terminal device that is received by the first terminal device.

The demodulation information includes control information for demodulating the transmission signal of the first terminal device and control information for demodulating a transmission signal of the second terminal device.

In this embodiment of the present disclosure, during pairing at a plurality of layers, the processing module 301 targetedly determines, according to transmission modes of the first terminal device and the second terminal device, content of the demodulation information to be sent, so as to effectively resolve a problem that, during pairing at a plurality of layers, when different power ratios are configured on different subbands, a large amount of signaling needs to be consumed for notification to the first terminal device. In this way, unnecessary signaling overheads are reduced to some extent, and the first terminal device can dynamically and accurately obtain and demodulate the transmission signal of the first terminal device, to implement correct descrambling.

Optionally, in some embodiments of the present disclosure, when the first transmission type is non-codebook-based transmission and the second transmission type is codebook-based transmission, the demodulation information includes the transmission mode of the second terminal device and layer pairing information between the first terminal device and the second terminal device or includes a transmission manner of the second terminal device and layer pairing information between the first terminal device and the second terminal device.

Optionally, in some embodiments of the present disclosure, when the first transmission type is codebook-based transmission and the second transmission type is non-codebook-based transmission, the demodulation information includes layer pairing information between the first terminal device and the second terminal device and power pairing information between the first terminal device and the second terminal device; or the demodulation information includes an antenna port of the second terminal device, a scrambling identity of the second terminal device, and a layer number of the second terminal device; or the demodulation information includes layer pairing information between the first terminal device and the second terminal device and a scrambling identity of the second terminal device.

Optionally, in some embodiments of the present disclosure, when the first transmission type is non-codebook-based transmission, the second transmission type is non-codebook-based transmission, and a reference signal used by the first terminal device at a pairing spatial layer is the same as a reference signal used by the second terminal device at the pairing spatial layer, the demodulation information includes layer pairing information between the first terminal device and the second terminal device and power pairing information between the first terminal device and the second terminal device.

Optionally, in some embodiments of the present disclosure, when the first transmission type is non-codebook-based transmission, the second transmission type is non-codebook-based transmission, and a reference signal used by the first terminal device at a pairing spatial layer is different from a reference signal used by the second terminal device at the pairing spatial layer, the demodulation information includes layer pairing information between the first terminal device and the second terminal device and power pairing information between the first terminal device and the second terminal device; or the demodulation information includes an antenna port of the second terminal device, a scrambling identity of the second terminal device, and a layer number of the second terminal device; or the demodulation information includes layer pairing information between the first terminal device and the second terminal device and a scrambling identity of the second terminal device.

Optionally, in some embodiments of the present disclosure, the demodulation information further includes a multiplexing mode and transmission information, the multiplexing mode represents association information between a data signal of the first terminal device and the reference signal used by the second terminal device at the pairing layer, and the transmission information includes a signal and data that are received by the first terminal device when the first terminal device and the second terminal device are paired, and a signal and data that are received by the second terminal device when the first terminal device and the second terminal device are paired.

Optionally, in some embodiments of the present disclosure, when the first terminal device and the second terminal device use at least two same spatial layers, the demodulation information carries a modulation scheme of the first terminal device at each spatial layer and the power pairing information; or when the first terminal device and the second terminal device use at least two same spatial layers, the power pairing information is obtained after the base station schedules same power allocation information of the first terminal device and the second terminal device at the at least two spatial layers, the demodulation information further carries modulation scheme combination information, and the modulation scheme combination information is obtained after the base station schedules same modulation schemes of the first terminal device and the second terminal device at the at least two spatial layers.

Optionally, in some embodiments of the present disclosure, the processing module 301 is further configured to:

when a reference signal used by the second terminal device that performs non-codebook-based transmission and data sent by the first terminal device that performs codebook-based transmission have a conflict in a time domain and a frequency domain, perform puncturing or rate matching on the data of the first terminal device; or when a reference signal used by the first terminal device that performs non-codebook-based transmission and data sent by the second terminal device that performs codebook-based transmission have a conflict in a time domain and a frequency domain, perform puncturing or rate matching on the data sent by the second terminal device.

Figure 4:
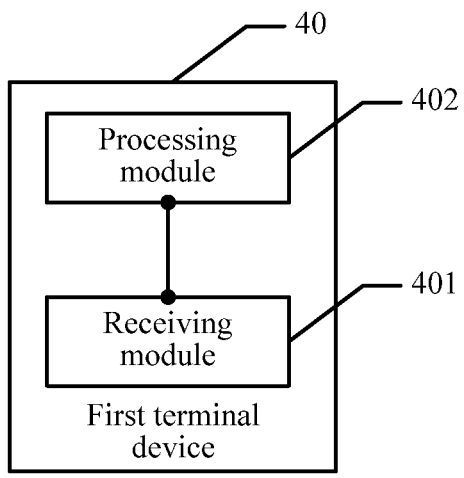
FIG. 4 is a structural diagram of a first terminal device according to an embodiment of the present disclosure.

The following describes a first terminal device that executes the foregoing signal demodulation method. Referring to FIG. 4, a first terminal device 40 in an embodiment of the present disclosure includes:

a receiving module 401, configured to receive demodulation information sent by abase station, where the demodulation information is information sent by the base station according to a first transmission type of the first terminal device and a second transmission type of a second terminal device by using downlink control signaling; and a processing module 402, configured to demodulate a received transmission signal of the first terminal device according to the demodulation information.

The demodulation information includes control information for demodulating the transmission signal of the first terminal device and control information for demodulating a transmission signal of the second terminal device.

In this embodiment of the present disclosure, during pairing at a plurality of layers, the receiving module 401 receives the demodulation information sent by the base station according to transmission modes of the first terminal device and the second terminal device, and the processing module 402 demodulates the received transmission signal of the first terminal device according to content of the demodulation information. In this way, unnecessary signaling overheads are reduced to some extent, and the first terminal device can dynamically and accurately obtain and demodulate the transmission signal of the first terminal device, to implement correct descrambling.

Optionally, in some embodiments of the present disclosure, when the first transmission type is non-codebook-based transmission and the second transmission type is codebook-based transmission, the demodulation information includes the transmission mode of the second terminal device and layer pairing information between the first terminal device and the second terminal device or includes a transmission manner of the second terminal device and layer pairing information between the first terminal device and the second terminal device.

Optionally, in some embodiments of the present disclosure, when the first transmission type is codebook-based transmission and the second transmission type is non-codebook-based transmission, the demodulation information includes layer pairing information between the first terminal device and the second terminal device and power pairing information between the first terminal device and the second terminal device; or the demodulation information includes an antenna port of the second terminal device, a scrambling identity of the second terminal device, and a layer number of the second terminal device; or the demodulation information includes layer pairing information between the first terminal device and the second terminal device and a scrambling identity of the second terminal device.

Optionally, in some embodiments of the present disclosure, when the first transmission type is non-codebook-based transmission, the second transmission type is non-codebook-based transmission, and a reference signal used by the first terminal device at a pairing spatial layer is the same as a reference signal used by the second terminal device at the pairing spatial layer, the demodulation information includes layer pairing information between the first terminal device and the second terminal device and power pairing information between the first terminal device and the second terminal device.

Optionally, in some embodiments of the present disclosure, when the first transmission type is non-codebook-based transmission, the second transmission type is non-codebook-based transmission, and a reference signal used by the first terminal device at a pairing spatial layer is different from a reference signal used by the second terminal device at the pairing spatial layer, the demodulation information includes layer pairing information between the first terminal device and the second terminal device and power pairing information between the first terminal device and the second terminal device; or the demodulation information includes an antenna port of the second terminal device, a scrambling identity of the second terminal device, and a layer number of the second terminal device; or the demodulation information includes layer pairing information between the first terminal device and the second terminal device and a scrambling identity of the second terminal device.

Optionally, in some embodiments of the present disclosure, the demodulation information further includes a multiplexing mode and transmission information, the multiplexing mode represents association information between a data signal of the first terminal device and the reference signal used by the second terminal device at the pairing spatial layer, and the transmission information includes a signal and data that are received by the first terminal device when the first terminal device and the second terminal device are paired, and a signal and data that are received by the second terminal device when the first terminal device and the second terminal device are paired.

Optionally, in some embodiments of the present disclosure, the processing module 402 is further configured to perform at least one of the following steps:

performing channel estimation on the reference signal of the second terminal device corresponding to the antenna port or the scrambling identity, to obtain a second power used by the second terminal device to send the transmission signal, and obtaining the power pairing information according to the second power and a first power used by the first terminal device to send a signal; and obtaining the layer pairing information according to the layer number and a layer number of the first terminal device; or performing channel estimation on the reference signal of the second terminal device corresponding to the scrambling identity, to obtain a second power used by the second terminal device to send the transmission signal, and obtaining the power pairing information according to the second power and a first power used by the first terminal device to send a signal.

The processing module 402 is specifically configured to:
demodulate the transmission signal according to the power pairing information and the layer pairing information.

Optionally, in some embodiments of the present disclosure, a reference signal used by the second terminal device at the pairing spatial layer is obtained according to at least one of the following:

obtaining the reference signal by detecting a channel by the first terminal device;

obtaining the reference signal according to the antenna port; or obtaining the reference signal according to the scrambling identity.

Optionally, in some embodiments of the present disclosure, when the first terminal device and the second terminal device use at least two same spatial layers, the demodulation information carries a modulation scheme of the first terminal device at each spatial layer and the power pairing information; or when the first terminal device and the second terminal device use at least two same spatial layers, the power pairing information is obtained after the base station schedules same power allocation information of the first terminal device and the second terminal device at the at least two spatial layers, the demodulation information further carries modulation scheme combination information, and the modulation scheme combination information is obtained after the base station schedules same modulation schemes of the first terminal device and the second terminal device at the at least two spatial layers.

The present disclosure further provides a computer storage medium. The medium stores a program. When being executed, the program includes some or all steps in the foregoing downlink control signaling sending method or signal demodulation method.

The present disclosure further provides a computer storage medium. The medium stores a program. When being executed, the program includes some or all steps in the downlink control signaling sending method performed by the base station or the signal demodulation method performed by the first terminal device.

It should be noted that, in this embodiment of the present disclosure, for the base station 30 in FIG. 3, the processing module 301 may be implemented by a processor, and the sending module 302 may be implemented by a transmitter.

Figure 5:
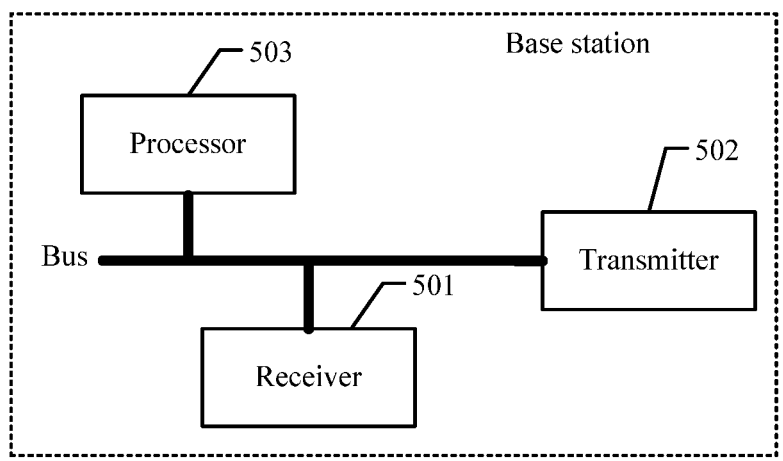
FIG. 5 is a structural diagram of another base station according to an embodiment of the present disclosure.

FIG. 5 is another schematic structural diagram of a base station 50 according to an embodiment of the present disclosure. The base station 50 may include at least one network interface or another communications interface, at least one receiver 501, at least one transmitter 502, at least one processor 503, and a memory 504, to implement a connection and communication between the apparatuses. When communication and a connection are implemented between a system gateway and at least one another network element by using at least one network interface (which may be wired or wireless), the Internet, a wide area network, a local network, a metropolitan area network or the like may be used.

The memory 504 may include a read-only memory and a random access memory, and provide an instruction and data to the processor 503. A part of the memory 504 may further include a high-speed random access memory (RAM), or may further include a non-volatile memory.

The memory 504 stores the following elements: an executable module, a data structure, a subset of an executable module and a data structure, or an extended set of an executable module and a data structure;
  an operation instruction that includes various operation instructions and that is used to implement various operations; and
  an operating system that includes various system programs and that is used to implement various fundamental services and process hardware-based tasks.

In this embodiment of the present disclosure, the processor 503 invokes the operation instruction (where the operation instructions may be stored in the operating system) stored in the memory 504, to perform the following operations:
  determining a first transmission type of a first terminal device and a second transmission type of a second terminal device; and
  sending, by the transmitter 502 according to the determined first transmission type and second transmission type, demodulation information to the first terminal device by using downlink control signaling, where the demodulation information is used to instruct the first terminal device to demodulate a transmission signal of the first terminal device that is received by the first terminal device.

The demodulation information includes control information for demodulating the transmission signal of the first terminal device and control information for demodulating a transmission signal of the second terminal device.

Optionally, when the first transmission type is non-codebook-based transmission and the second transmission type is codebook-based transmission, the demodulation information includes a transmission mode of the second terminal device and layer pairing information between the first terminal device and the second terminal device or includes a transmission manner of the second terminal device and layer pairing information between the first terminal device and the second terminal device.

Optionally, when the first transmission type is codebook-based transmission and the second transmission type is non-codebook-based transmission, the demodulation information includes layer pairing information between the first terminal device and the second terminal device and power pairing information between the first terminal device and the second terminal device; or
  the demodulation information includes an antenna port of the second terminal device, a scrambling identity of the second terminal device, and a layer number of the second terminal device; or
  the demodulation information includes layer pairing information between the first terminal device and the second terminal device and a scrambling identity of the second terminal device.

Optionally, when the first transmission type is non-codebook-based transmission, the second transmission type is non-codebook-based transmission, and a reference signal used by the first terminal device at a pairing spatial layer is the same as a reference signal used by the second terminal device at the pairing spatial layer, the demodulation information includes layer pairing information between the first terminal device and the second terminal device and power pairing information between the first terminal device and the second terminal device.

Optionally, when the first transmission type is non-codebook-based transmission, the second transmission type is non-codebook-based transmission, and a reference signal used by the first terminal device at a pairing spatial layer is different from a reference signal used by the second terminal device at the pairing spatial layer, the demodulation information includes layer pairing information between the first terminal device and the second terminal device and power pairing information between the first terminal device and the second terminal device; or
  the demodulation information includes an antenna port of the second terminal device, a scrambling identity of the second terminal device, and a layer number of the second terminal device; or
  the demodulation information includes layer pairing information between the first terminal device and the second terminal device and a scrambling identity of the second terminal device.

Optionally, the demodulation information further includes a multiplexing mode and transmission information, the multiplexing mode represents association information between a data signal of the first terminal device and the reference signal used by the second terminal device at the pairing layer, and the transmission information includes a signal and data that are received by the first terminal device when the first terminal device and the second terminal device are paired, and a signal and data that are received by the second terminal device when the first terminal device and the second terminal device are paired.

Optionally, when the first terminal device and the second terminal device use at least two same spatial layers, the demodulation information carries a modulation scheme of the first terminal device at each spatial layer and the power pairing information; or
  when the first terminal device and the second terminal device use at least two same spatial layers, the power pairing information is obtained after the base station schedules same power allocation information of the first terminal device and the second terminal device at the at least two spatial layers, the demodulation information further carries modulation scheme combination information, and the modulation scheme combination information is obtained after the base station schedules same modulation schemes of the first terminal device and the second terminal device at the at least two spatial layers.

In some implementations, the processor 503 may further perform the following steps:

when a reference signal used by the second terminal device that performs non-codebook-based transmission and data sent by the first terminal device that performs codebook-based transmission have a conflict in a time domain and a frequency domain, performing puncturing or rate matching on the data of the first terminal device; or when a reference signal used by the first terminal device that performs non-codebook-based transmission and data sent by the second terminal device that performs codebook-based transmission have a conflict in a time domain and a frequency domain, performing puncturing or rate matching on the data sent by the second terminal device.

It should be noted that, in this embodiment of the present disclosure, for the first terminal device 40 in FIG. 4, the receiving module 401 may be implemented by a receiver, and the processing module 402 may be implemented by a processor.

Figure 6:
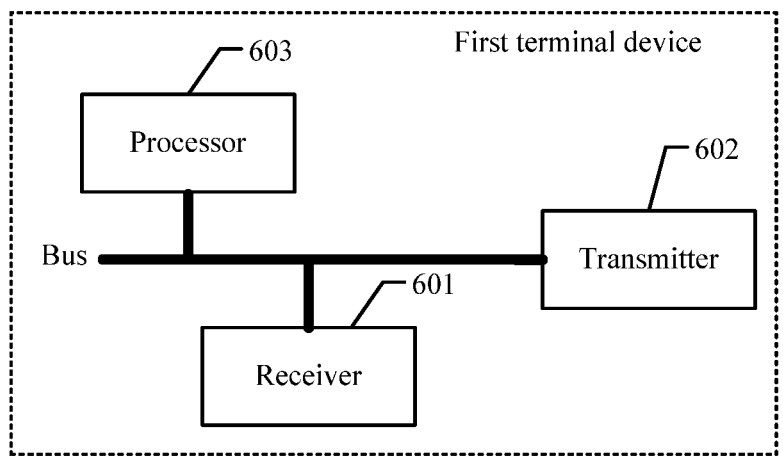
FIG. 6 is a structural diagram of another first terminal device according to an embodiment of the present disclosure.

FIG. 6 is another schematic structural diagram of a first terminal device 60 according to an embodiment of the present disclosure. The first terminal device 60 may include at least one network interface or another communications interface, at least one receiver 601, at least one transmitter 602, at least one processor 603, and a memory 604, to implement a connection and communication between the apparatuses. When communication and a connection are implemented between a system gateway and at least one another network element by using at least one network interface (which may be wired or wireless), the Internet, a wide area network, a local network, a metropolitan area network or the like may be used.

The memory 604 may include a read-only memory and a random access memory, and provide an instruction and data to the processor 603. A part of the memory 604 may further include a high-speed random access memory (RAM), or may further include a non-volatile memory.

The memory 604 stores the following elements: an executable module, a data structure, a subset of an executable module and a data structure, or an extended set of an executable module and a data structure;

an operation instruction that includes various operation instructions and that is used to implement various operations; and an operating system that includes various system programs and that is used to implement various fundamental services and process hardware-based tasks.

In this embodiment of the present disclosure, the processor 603 invokes the operation instruction (where the operation instructions may be stored in the operating system) stored in the memory 604, to perform the following operations:

receiving, by the receiver 601, demodulation information sent by a base station, where the demodulation information is information sent by the base station according to a first transmission type of the first terminal device and a second transmission type of a second terminal device by using downlink control signaling; and demodulating a received transmission signal of the first terminal device according to the demodulation information.

The demodulation information includes control information for demodulating the transmission signal of the first terminal device and control information for demodulating a transmission signal of the second terminal device.

Optionally, when the first transmission type is non-codebook-based transmission and the second transmission type is codebook-based transmission, the demodulation information includes a transmission mode of the second terminal device and layer pairing information between the first terminal device and the second terminal device or includes a transmission manner of the second terminal device and layer pairing information between the first terminal device and the second terminal device.

Optionally, when the first transmission type is codebook-based transmission and the second transmission type is non-codebook-based transmission, the demodulation information includes layer pairing information between the first terminal device and the second terminal device and power pairing information between the first terminal device and the second terminal device; or the demodulation information includes an antenna port of the second terminal device, a scrambling identity of the second terminal device, and a layer number of the second terminal device; or the demodulation information includes layer pairing information between the first terminal device and the second terminal device and a scrambling identity of the second terminal device.

Optionally, when the first transmission type is non-codebook-based transmission, the second transmission type is non-codebook-based transmission, and a reference signal used by the first terminal device at a pairing spatial layer is the same as a reference signal used by the second terminal device at the pairing spatial layer, the demodulation information includes layer pairing information between the first terminal device and the second terminal device and power pairing information between the first terminal device and the second terminal device.

Optionally, when the first transmission type is non-codebook-based transmission, the second transmission type is non-codebook-based transmission, and a reference signal used by the first terminal device at a pairing spatial layer is different from a reference signal used by the second terminal device at the pairing spatial layer, the demodulation information includes layer pairing information between the first terminal device and the second terminal device and power pairing information between the first terminal device and the second terminal device; or the demodulation information includes an antenna port of the second terminal device, a scrambling identity of the second terminal device, and a layer number of the second terminal device; or the demodulation information includes layer pairing information between the first terminal device and the second terminal device and a scrambling identity of the second terminal device.

Optionally, the demodulation information further includes a multiplexing mode and transmission information, the multiplexing mode represents association information between a data signal of the first terminal device and the reference signal used by the second terminal device at the pairing spatial layer, and the transmission information includes a signal and data that are received by the first terminal device when the first terminal device and the second terminal device are paired, and a signal and data that are received by the second terminal device when the first terminal device and the second terminal device are paired.

In some implementations, the processor 603 may further perform the following steps:

performing channel estimation on the reference signal of the second terminal device corresponding to the antenna port or the scrambling identity, to obtain a second power used by the second terminal device to send the transmission signal, and obtaining the power pairing information according to the second power and a first power used by the first terminal device to send a signal; and obtaining the layer pairing information according to the layer number and a layer number of the first terminal device; or performing channel estimation on the reference signal of the second terminal device corresponding to the scrambling identity, to obtain a second power used by the second terminal device to send the transmission signal, and obtaining the power pairing information according to the second power and a first power used by the first terminal device to send a signal; and demodulating the transmission signal according to the power pairing information and the layer pairing information.

Optionally, a reference signal used by the second terminal device at the pairing spatial layer is obtained according to at least one of the following:

obtaining the reference signal by detecting a channel by the first terminal device;

obtaining the reference signal according to the antenna port; or obtaining the reference signal according to the scrambling identity.

Optionally, when the first terminal device and the second terminal device use at least two same spatial layers, the demodulation information carries a modulation scheme of the first terminal device at each spatial layer and the power pairing information; or when the first terminal device and the second terminal device use at least two same spatial layers, the power pairing information is obtained after the base station schedules same power allocation information of the first terminal device and the second terminal device at the at least two spatial layers, the demodulation information further carries modulation scheme combination information, and the modulation scheme combination information is obtained after the base station schedules same modulation schemes of the first terminal device and the second terminal device at the at least two spatial layers.

In the foregoing embodiments, the description of each embodiment has a respective focus. For a part that is not described in detail in an embodiment, refer to related descriptions in other embodiments.

It may be clearly understood by persons skilled in the art that, for the purpose of convenient and brief description, for a specific working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division, and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be allocated on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the steps of the methods described in the embodiments of the present disclosure. The foregoing storage medium includes any medium that can store program code, such as a USB flash drive, a removable hard disk, a read-only memory (ROM), a random-access memory (RAM), a magnetic disk, or an optical disc.

The downlink control signaling sending method and device provided in the present disclosure are described in detail above. The principle and implementation of the present disclosure are described in this specification by using specific examples. The description about the embodiments is merely provided to help understand the method and core ideas of the present disclosure. In addition, persons of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. A downlink control signaling sending method, comprising:

determining, by a base station, a first transmission type of a first terminal device and a second transmission type of a second terminal device, wherein the first transmission type is different than the second transmission type; and sending, by the base station, demodulation information to the first terminal device according to the first transmission type and the second transmission type using downlink control signaling, wherein the demodulation information comprises first control information enabling successful demodulation, by the first terminal device, of a transmission signal of the first terminal device and second control information enabling successful demodulation, by the first terminal device, of a transmission signal of the second terminal device, wherein the demodulation information instructs the first terminal device to demodulate the transmission signal of the first terminal device using the first control information and the second control information, wherein the demodulation information further comprises a multiplexing mode and transmission information, wherein the multiplexing mode represents association information between a data signal of the first terminal device and a reference signal used by the second terminal device at the pairing layer, and wherein the transmission information comprises:
  a signal and data received by the first terminal device when the first terminal device and the second terminal device are paired; and
  a signal and data that are received by the second terminal device when the first terminal device and the second terminal device are paired.

2. The method of claim 1, wherein when the first transmission type is non-codebook-based transmission and the second transmission type is codebook-based transmission, the demodulation information comprises:
  a transmission mode of the second terminal device and layer pairing information between the first terminal device and the second terminal device; or
  a transmission manner of the second terminal device and layer pairing information between the first terminal device and the second terminal device.

3. The method of claim 1, wherein when the first transmission type is codebook-based transmission and the second transmission type is non-codebook-based transmission, the demodulation information comprises:
  layer pairing information between the first terminal device and the second terminal device and power pairing information between the first terminal device and the second terminal device;
  an antenna port of the second terminal device, a scrambling identity of the second terminal device, and a layer number of the second terminal device; or
  layer pairing information between the first terminal device and the second terminal device and a scrambling identity of the second terminal device.

4. The method of claim 1, wherein when the first transmission type is non-codebook-based transmission, the second transmission type is non-codebook-based transmission, and a reference signal used by the first terminal device at a pairing spatial layer is the same as a reference signal used by the second terminal device at the pairing spatial layer, the demodulation information comprises layer pairing information between the first terminal device and the second terminal device and power pairing information between the first terminal device and the second terminal device.

5. The method of claim 1, wherein when the first transmission type is non-codebook-based transmission, the second transmission type is non-codebook-based transmission, and a reference signal used by the first terminal device at a pairing spatial layer is different from a reference signal used by the second terminal device at the pairing spatial layer, the demodulation information comprises:
  layer pairing information between the first terminal device and the second terminal device and power pairing information between the first terminal device and the second terminal device;
  an antenna port of the second terminal device, a scrambling identity of the second terminal device, and a layer number of the second terminal device; or
  layer pairing information between the first terminal device and the second terminal device and a scrambling identity of the second terminal device.

6. The method of claim 1, wherein when the first terminal device and the second terminal device use at least two same spatial layers:
  the demodulation information carries a modulation scheme of the first terminal device at each spatial layer and power pairing information between the first terminal device and the second terminal device; or
  the power pairing information is obtained after the base station schedules same power allocation information of the first terminal device and the second terminal device at the at least two same spatial layers, wherein the demodulation information further carries modulation scheme combination information, and wherein the modulation scheme combination information is obtained after the base station schedules same modulation schemes of the first terminal device and the second terminal device at the at least two same spatial layers.

7. The method of claim 6, further comprising:
  when a first reference signal used by the second terminal device that performs non-codebook-based transmission and data sent by the first terminal device that performs codebook-based transmission have a conflict in a time domain and a frequency domain, performing, by the base station, puncturing or rate matching on the data sent by the first terminal device; or
  when a second reference signal used by the first terminal device that performs non-codebook-based transmission and data sent by the second terminal device that performs codebook-based transmission have a conflict in a time domain and a frequency domain, performing, by the base station, puncturing or rate matching on the data sent by the second terminal device.

8. The method of claim 1, when a first reference signal used by the second terminal device that performs non-codebook-based transmission and data sent by the first terminal device that performs codebook-based transmission have a conflict in a time domain and a frequency domain, performing, by the base station, puncturing or rate matching on the data sent by the first terminal device.

9. A base station, comprising:
  a processor configured to determine a first transmission type of a first terminal device and a second transmission type of a second terminal device; and
  a transmitter coupled to the processor and configured to send, according to the first transmission type and the second transmission type, demodulation information to the first terminal device using downlink control signaling, wherein the demodulation information comprises first control information enabling successful demodulation, by the first terminal device, of a transmission signal of the first terminal device and second control information enabling successful demodulation, by the first terminal device, of a transmission signal of the second terminal device, the demodulation information instructs the first terminal device to demodulate the transmission signal of the first terminal device using the first control information and the second control information, wherein the demodulation information further comprises a multiplexing mode and transmission information, wherein the multiplexing mode represents association information between a data signal of the first terminal device and the reference signal used by the second terminal device at the pairing layer, and wherein the transmission information comprises:
  a signal and data received by the first terminal device when the first terminal device and the second terminal device are paired; and
  a signal and data received by the second terminal device when the first terminal device and the second terminal device are paired.

10. The base station of claim 9, wherein when the first transmission type is non-codebook-based transmission and the second transmission type is codebook-based transmission, the demodulation information comprises:
- a transmission mode of the second terminal device and layer pairing information between the first terminal device and the second terminal device; or
- a transmission manner of the second terminal device and layer pairing information between the first terminal device and the second terminal device.

11. The base station of claim 9, wherein when the first transmission type is codebook-based transmission and the second transmission type is non-codebook-based transmission, the demodulation information comprises:
- layer pairing information between the first terminal device and the second terminal device and power pairing information between the first terminal device and the second terminal device; or
- an antenna port of the second terminal device, a scrambling identity of the second terminal device, and a layer number of the second terminal device; or
- layer pairing information between the first terminal device and the second terminal device and a scrambling identity of the second terminal device.

12. The base station of claim 9, wherein when the first transmission type is non-codebook-based transmission, the second transmission type is non-codebook-based transmission, and a reference signal used by the first terminal device at a pairing spatial layer is the same as a reference signal used by the second terminal device at the pairing spatial layer, the demodulation information comprises layer pairing information between the first terminal device and the second terminal device and power pairing information between the first terminal device and the second terminal device.

13. The base station of claim 9, wherein when the first transmission type is non-codebook-based transmission, the second transmission type is non-codebook-based transmission, and a reference signal used by the first terminal device at a pairing spatial layer is different from a reference signal used by the second terminal device at the pairing spatial layer, the demodulation information comprises:
- layer pairing information between the first terminal device and the second terminal device and power pairing information between the first terminal device and the second terminal device; or
- an antenna port of the second terminal device, a scrambling identity of the second terminal device, and a layer number of the second terminal device; or
- layer pairing information between the first terminal device and the second terminal device and a scrambling identity of the second terminal device.

14. The base station of claim 9, wherein when the first terminal device and the second terminal device use at least two same spatial layers:
- the demodulation information carries a modulation scheme of the first terminal device at each spatial layer and power pairing information between the first terminal device and the second terminal device; or
- the power pairing information is obtained after the base station schedules same power allocation information of the first terminal device and the second terminal device at the at least two same spatial layers, wherein the demodulation information further carries modulation scheme combination information, and wherein the modulation scheme combination information is obtained after the base station schedules same modulation schemes of the first terminal device and the second terminal device at the at least two same spatial layers.

15. The base station of claim 14, wherein the processor is further configured to:
- when a first reference signal used by the second terminal device that performs non-codebook-based transmission and data sent by the first terminal device that performs codebook-based transmission have a conflict in a time domain and a frequency domain, perform puncturing or rate matching on the data sent by the first terminal device; or
- when a second reference signal used by the first terminal device that performs non-codebook-based transmission and data sent by the second terminal device that performs codebook-based transmission have a conflict in a time domain and a frequency domain, perform puncturing or rate matching on the data sent by the second terminal device.

16. A non-transitory computer readable storage medium comprising program code that, when executed by a processor, causes a base station to:
- determine a first transmission type of a first terminal device and a second transmission type of a second terminal device; and
- send demodulation information to the first terminal device according to the first transmission type and the second transmission type using downlink control signaling, wherein the demodulation information comprises first control information enabling successful demodulation, by the first terminal device, of a transmission signal of the first terminal device and second control information enabling successful demodulation, by the first terminal device, of a transmission signal of the second terminal device, wherein the demodulation information instructs the first terminal device to demodulate a transmission signal of the first terminal device that is received by the first terminal device using the first control information and the second control information, wherein the demodulation information further comprises a multiplexing mode and transmission information, wherein the multiplexing mode represents association information between a data signal of the first terminal device and the reference signal used by the second terminal device at the pairing layer, and wherein the transmission information comprises:
- a signal and data received by the first terminal device when the first terminal device and the second terminal device are paired; and
- a signal and data received by the second terminal device when the first terminal device and the second terminal device are paired.

* * * * *

UNITED STATES PATENT AND TRADEMARK OFFICE
CERTIFICATE OF CORRECTION

PATENT NO. : 10,686,633 B2
APPLICATION NO. : 15/934586
DATED : June 16, 2020
INVENTOR(S) : Zhiheng Guo et al.

Page 1 of 1

It is certified that error appears in the above-identified patent and that said Letters Patent is hereby corrected as shown below:

In the Claims

Claim 9, Column 34, Line 51: "device, the demodulation" should read "device, wherein the demodulation"

Signed and Sealed this
Eleventh Day of August, 2020

Andrei Iancu
*Director of the United States Patent and Trademark Office*